(12) United States Patent
Rader et al.

(10) Patent No.: US 6,504,699 B1
(45) Date of Patent: Jan. 7, 2003

(54) METHOD AND DEVICE FOR DRIVING A SOLENOID VALVE

(75) Inventors: Thomas Rader, Reutlingen (DE); Alexander Haeussler, Heidelberg (DE); Helmut Wiss, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 272 days.

(21) Appl. No.: 09/671,563

(22) Filed: Sep. 27, 2000

(30) Foreign Application Priority Data

Sep. 28, 1999 (DE) .......................................... 199 46 348

(51) Int. Cl.⁷ .............................................. H01H 47/00
(52) U.S. Cl. ................ 361/155; 303/119.2; 137/599.16
(58) Field of Search ................................ 361/160, 161, 361/163, 154, 155; 303/119.2, 113.2; 137/599.16, 599.17, 599.18, 508, 601.14; 251/129.02, 117

(56) References Cited

U.S. PATENT DOCUMENTS

| | | | | |
|---|---|---|---|---|
| 5,375,623 A | * | 12/1994 | Weber | 137/454.5 |
| 5,673,980 A | * | 10/1997 | Schwarz et al. | 303/119.2 |
| 5,727,852 A | | 3/1998 | Pueschel et al. | |
| 5,845,976 A | * | 12/1998 | Muenster | 303/155 |

FOREIGN PATENT DOCUMENTS

| | | |
|---|---|---|
| DE | 195 01 760 | 7/1996 |
| DE | 196 54 427 | 6/1998 |

* cited by examiner

*Primary Examiner*—Rajnikant B. Patel
(74) *Attorney, Agent, or Firm*—Kenyon & Kenyon

(57) ABSTRACT

A method and a device are proposed for driving a solenoid valve that has stroke ranges of a stable equilibrium of forces and stroke ranges of an unstable equilibrium of forces. For setting the predetermined differential pressure across the solenoid valve, a driving signal quantity is generated which is selected such that the stroke ranges of an unstable equilibrium of forces are avoided or the dwell time of the solenoid valve in these ranges is reduced.

8 Claims, 4 Drawing Sheets

METHOD AND DEVICE FOR DRIVING A SOLENOID VALVE

FIELD OF THE INVENTION

The present invention relates to a method and a device for driving a solenoid valve.

BACKGROUND INFORMATION

Electrically controlled solenoid valves are used as pressure control valves in many areas of technology. One particular area of the use of solenoid valves of this type is the braking system of a motor vehicle, in which the pressure in the wheel brake cylinders is controlled by actuating solenoid valves. One example of this type of control system of a solenoid valve is described in German Published Patent Application No. 195 01 760 (U.S. Pat. No. 5,727,852). There, a hydraulic braking system is described in which the pressures to be controlled in the wheel brake cylinders are adjusted by controlling at least one solenoid valve in accordance with a setpoint value. By actuating this solenoid valve in at least one wheel brake, pressure is built up, maintained, or reduced. In this context, the solenoid valve is controlled in the context of a pressure-regulating circuit, which sets a preestablished setpoint value for the pressure in the wheel brake.

A further method and a further device for controlling a pressure-regulating valve in a braking system is described in German Published Patent Application No. 196 54 427. There, for controlling the pressure in at least one wheel brake in the context of a pressure-regulating circuit, at least one control valve is driven such that the valve demonstrates offset behavior. In this context, a pressure regulator is provided which generates a pulse-width-modulated driving signal for the valve or a current setpoint value for the current flowing through the valve winding as a function of the deviation of the pressure measured in the area of a wheel brake from a preestablished setpoint value. The opening cross-section of the valve and therefore the volumetric flow through the valve is adjusted in accordance with the driving signal quantity. As a result of the feedback control, a predetermined pressure differential is set across the valve. The pulse-width-modulated driving signal, in this context, is selected such that an average current through the valve winding is set corresponding to the opening cross-section.

In some application cases, setting a very small pressure differential using a valve drive of this type has proven to be problematic because under certain operating conditions a spontaneous opening of the solenoid valve has been observed.

SUMMARY OF THE INVENTION

It is an objective of the present invention to indicate measures for driving a solenoid valve, which can function to set even a very small pressure differential across the valve.

Setting a very small pressure differential is made possible even in valves that, at least under certain operating conditions, open spontaneously in response to small pressure differentials. As a result of the fact that, using the driving method, it is not an average current that is set but rather, in the context of a preestablished frequency, a current that brings about an alternating closing and opening of the valve for setting the small pressure differential, the spontaneous opening of the valve is counteracted. Even in the event that the solenoid valve spontaneously opens, the valve is closed once again by an increased flow of current brought about in accordance with the stipulation of the drive frequency, and in this manner the desired pressure differential is maintained.

In an advantageous manner, the driving process is selected such that the opening ranges of the valve (stroke ranges) are avoided, in which a spontaneous opening of the valve is expected, or the dwell time of the solenoid valve is limited in these ranges, due to the fact that the valve is always actuated by the drive outside of these stroke ranges.

Particularly advantageous is the application of the driving method to a solenoid valve which is used in connection with the electrical control of a braking system, in particular with buildup of very small brake pressure values, such as is desirable, e.g., in connection with an automatic braking process.

DETAILED DESCRIPTION

Figure 1:
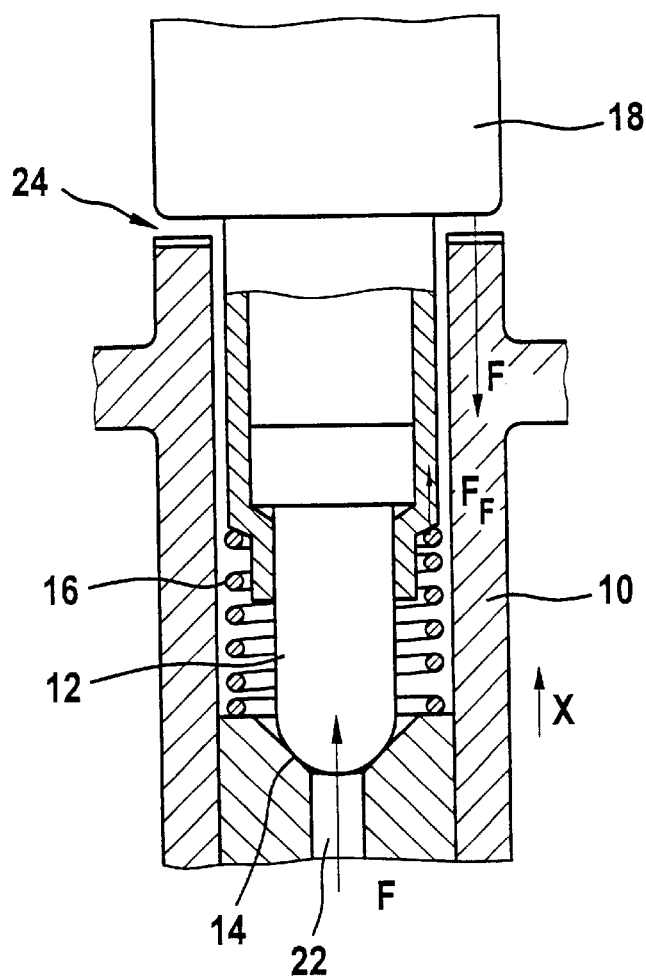
FIG. 1 depicts the basic design of a solenoid valve.

In FIG. 1, a solenoid valve is schematically represented, which is composed of a housing 10, a valve needle 12, a valve seat 14, a first spring 16 that is prestressed in the direction of the opening of the valve, and a valve armature 18, which, through electromagnetic actuation, actuates the armature in the X direction depicted in FIG. 1. The forces acting upon the armature are pressure $F_{pressure}$ at valve outlet 22, spring tension $F_F$ directed in the opening direction, and magnetic force $F_{mag}$ directed in the closing direction. Magnetic force $F_{mag}$ is generated in a stable equilibrium made up of the sum of pressure force $F_{pressure}$ and $F_F$. Magnetic force $F_{mag}$ itself is determined by the current flowing through the one control coil of armature 18 and is preselected in accordance with the $F_{Druck}$ desired, for example, in the context of a pressure-regulating circuit. This pressure represents a differential pressure across the valve with regard to the input pressure on valve input 24. If the latter essentially corresponds to atmospheric pressure (as is usually the case when the pedal of a braking system is not actuated), outlet-side pressure $F_{pressure}$ represents the differential pressure.

Figure 2:
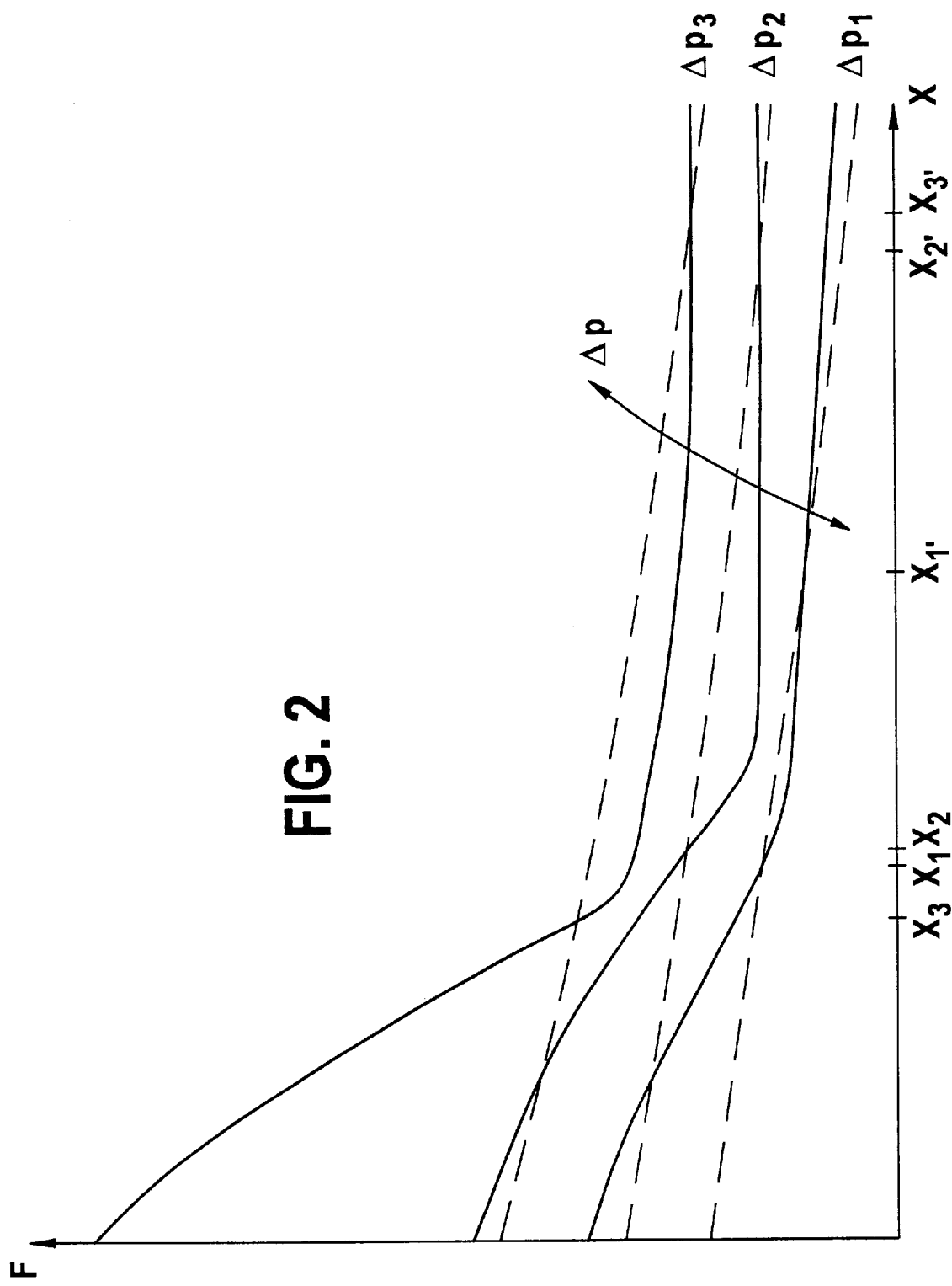
FIG. 2 depicts typical characteristic curves for different differential pressures of a selected solenoid valve.

The characteristic curves for the opening and closing forces across the stroke of a valve of this type are depicted for different pressure differentials Δp in FIG. 2. As a result of a conventional pulse-width-modulated driving process, which sets the valve an average current flowing through the valve coil and thus maintains the armature in a middle position, a stable equilibrium of forces is achieved if closing force $F_{mag}$ is greater than opening forces $F_{pressure} + F_F$. If this is the other way around, i.e., if the opening forces are greater than the closing forces, then an unstable equilibrium arises with the consequence that the valve unintentionally opens in response to the slightest disturbance. In this manner, the desired pressure differential across the valve collapses. In FIG. 2, for three different pressure differential values, $\Delta p1$, $\Delta p2$, and $\Delta p3$, the curves of the opening forces (solid) and the closing forces (dotted) are plotted over stroke X. In this context, it is possible to clearly establish intersection points (X1, X1', X2, X2', X3, X3') of the specific straight lines, which divide stroke range X into unstable and stable ranges. In response to small differential pressures ($\Delta p1 < \Delta p3$), the intersection points which separate the stable and the unstable ranges shift towards the smaller strokes and the intersection points gather together. Therefore, as the differential pressures become smaller, the danger increases that in response to small disturbances to the solenoid valve, the needle of the solenoid valve will move through the stable range of the stroke into the unstable range and will then suddenly open.

If the valve in the context of a pressure regulation system is driven using a pulse-width-modulated signal in accordance with the related art cited above, then as a rule the driving frequency for the valve coil is selected so as to be smaller than the inherent frequency of the valve used, and the pulse width is set such that an average current through the valve coil results, thus setting the valve at a correspondingly middle position. However, during the driving process, the valve moves across a relatively large stroke range and can therefore end up in unstable ranges. A spontaneous opening of the valve and a collapse of the pressure differential across the valve is the consequence. No account is taken of the valve dynamics. The magnetic force set, in this case, is not sufficient for closing.

Figure 4A:
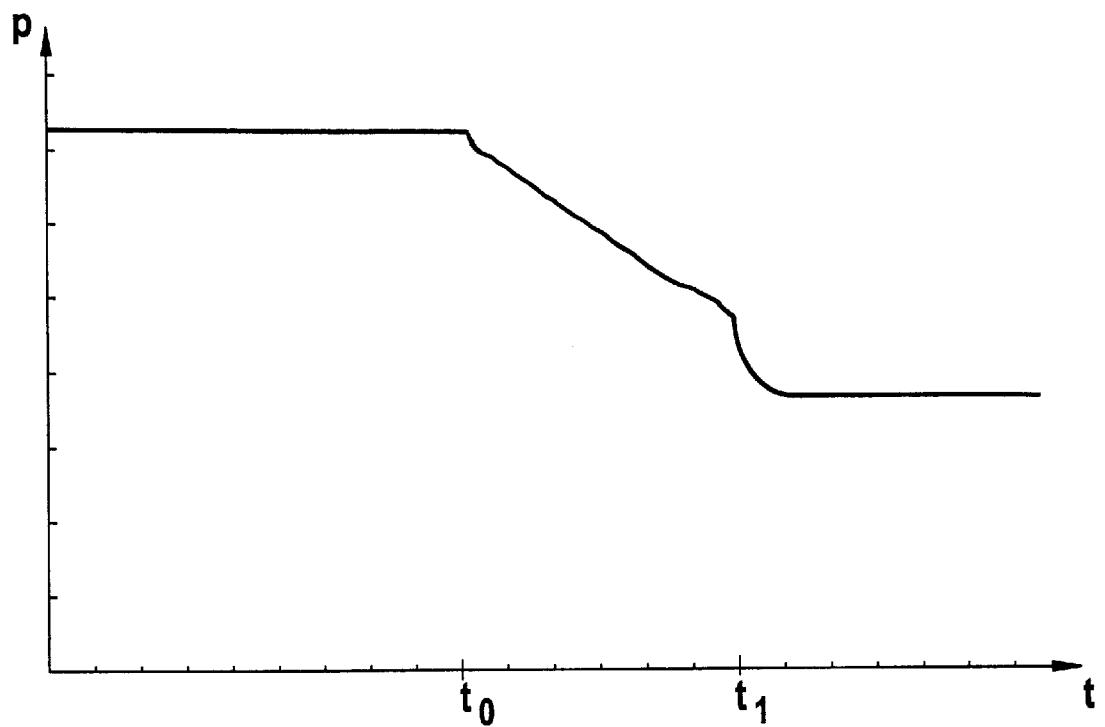
FIG. 4a, on the basis of a first timing diagram, depicts the mode of operation of this driving process for setting small differential pressures across the valve in comparison to a conventional, pulse-width-modulated driving process.

One example of behavior of this type is illustrated on the basis of the flowchart of FIG. 4a. There, a preselected pressure P (the differential pressure across the valve) is set, which at time point $T_0$ is abandoned. The pressure regulator now limits the pressure differential in an essentially linear manner until, by time point $T_1$, the valve moves into unstable ranges. The consequence is a sudden opening of the valve at time point $T_1$ and a collapse of the differential pressure across the valve, which makes it impossible to set very small differential pressures.

In order to avoid this behavior, the valve is driven, at least in the endangered stroke ranges, such that the stroke range of the valve is limited during a driving process, and the valve is therefore maintained in the stable range. The valve dynamics, in this context, are taken into account in the driving process.

Figure 3:
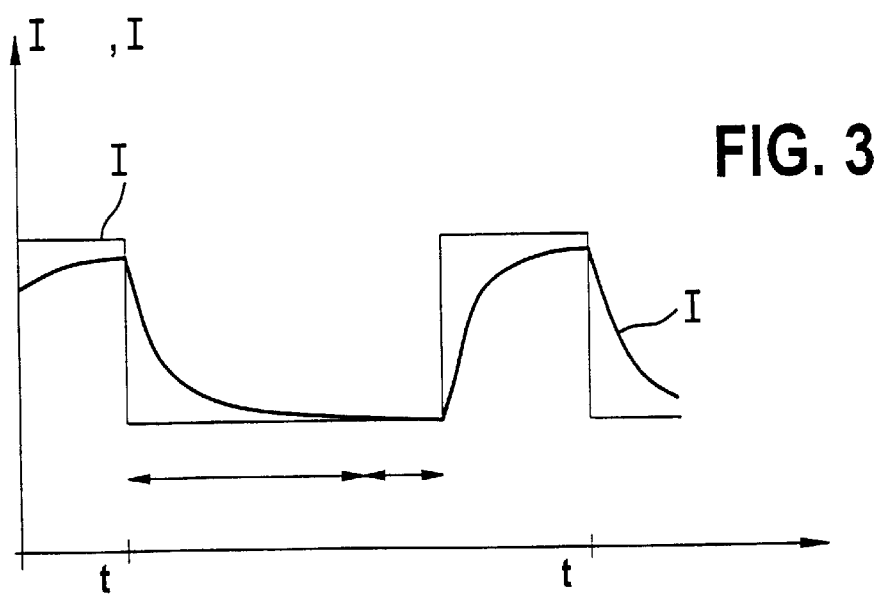
FIG. 3, in the example of a timing diagram, depicts the driving process for setting small differential pressures.

One example of a driving signal with whose assistance this requirement is met is depicted as a timing diagram in FIG. 3. The latter shows the timing curve of the setpoint and actual current in the valve coil over time. In this context, a period is plotted from $T_{cyclebegin}$ to $T_{cycleend}$. The driving signal is formed from two phases, a drop-off and a flow-through time. The setpoint current shows pulse-width modulated behavior, the duration of the phases changing in accordance with the pressure differential to be set. For one part of the drive cycle, the setpoint current for the desired pressure differential across the valve is stipulated (drop-off time+flow-through time). The actual current declines, in accordance with the inductance, from an increased value to the desired value, and the valve reaches a state of equilibrium. It is maintained there for a time, and then, after the termination of the flow-through time, the valve is once again acted upon by a stronger current and is therefore closed. Therefore, the valve is maintained in the range of the differential pressure regulation only for a preselected time (flow-through time), and it is then shifted to smaller strokes in order to avoid the unstable stroke ranges. Thus, a spontaneous springing open of the valve is avoided. The driving time at the current sufficient for the desired pressure differential is to be sufficiently large. In this context, the drop-off phase is to be large enough that the current drops to its setpoint value, whereas the flow-through time, subsequent thereto, is to be large enough to permit a sufficiently large volumetric flow to pass through the valve. Subsequently, the valve has even more current applied to it, in order to limit the valve stroke, which may have become too large.

In other words, the setpoint current preestablished for setting the desired pressure differential is stipulated as the base current for the valve driving process. In the context of a pulse-width-modulated signal, a larger current is stipulated for a preselected duration (=cycle time−(flow-through time+ drop-off time)), moving the valve in the closing direction. The pressure differential is set in accordance with the magnitude of the setpoint flow during the flow-through time or corresponding to the length of the individual driving times. If the valve should spontaneously open, a renewed closing of the valve is brought about by the subsequent increase in the setpoint current, so that even small pressure differentials can be set by the valve driving process.

Figure 4B:
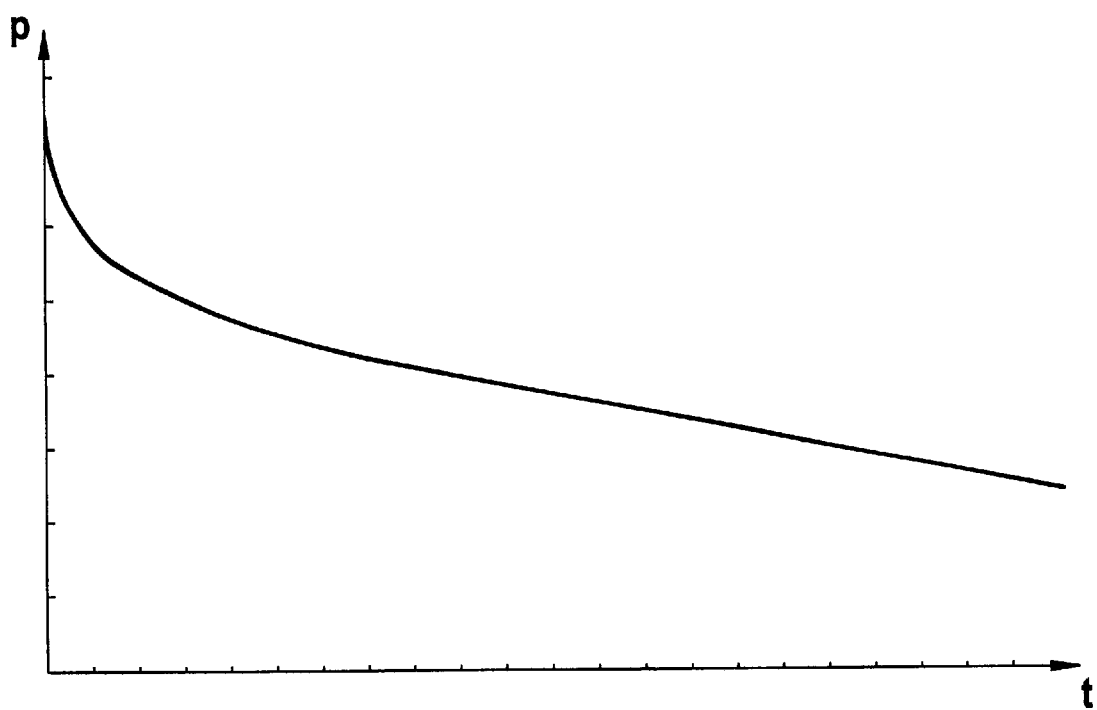
FIG. 4b, on the basis of a second timing diagram depicts the mode of operation of this driving process for setting small differential pressures across the valve in comparison to a conventional, pulse-width-modulated driving process.

The advantages of this mode of operation are shown by the timing diagram of FIG. 4b. There, the characteristic curve of a temporal, ramp-shaped reduction of the pressure differential is depicted, it being necessary to observe that no spontaneous opening of the valve takes place and very small pressure differentials can be set.

In the preferred exemplary embodiment, the valve is driven by the program of a microcomputer, which is part of a control unit for controlling the braking system. One example for a program of this type is depicted as a flowchart in FIG. 5. In the preferred exemplary embodiment, to which the flowchart in FIG. 5 refers, the valve is used as a control valve for the brake pressure buildup in a braking system in the context of an automatic braking process, preferably as a control valve that controls the opening of the brake line between the master cylinder and the wheel brakes. In this context, at the beginning of the braking process or in response to a corresponding demand, very small pressure differentials are set, i.e., very small braking pressures are set.

Figure 5:
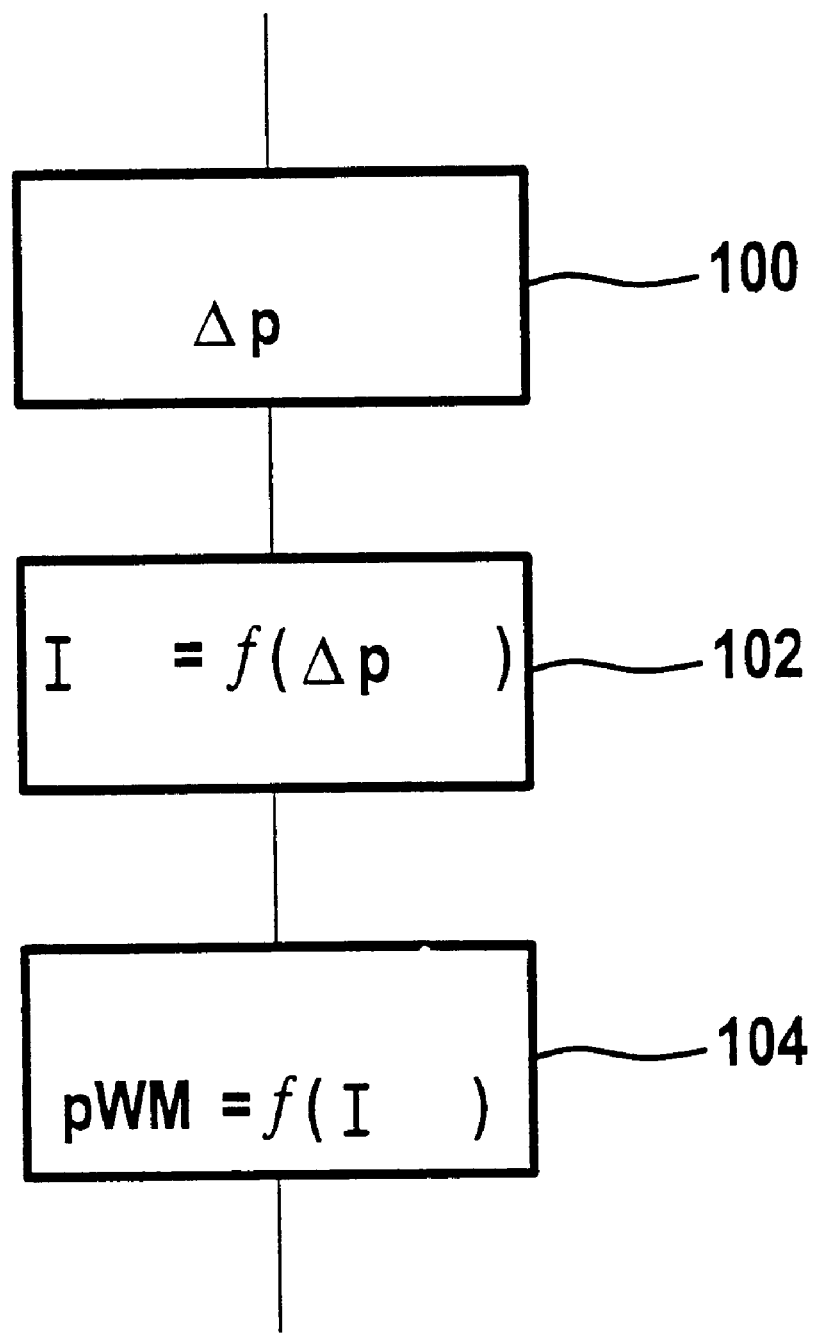
FIG. 5 shows a flowchart which represents a preferred specific realization of the driving process.

The program sketched in FIG. 5 is initiated at least when small pressure differentials are to be set by the regulator. After the start of the program part at preestablished time points, the predetermined setpoint differential pressure quantity $\Delta p_{setpoint}$, in first step 100, is read in. Thereupon, in step 102, the current setpoint quantity $I_{setpoint}$ necessary to set this pressure differential quantity is determined, for example, on the basis of tables, calculating steps, characteristic curves, or performance characteristics, optionally taking into account the actual pressure. Subsequently, in step 104, the driving signal is transmitted to the valve, the pulse duty factor of the driving signal being selected such that the valve driven for a preselected time by the setpoint current opens for a preselected flow-through time, and the desired differential pressure is set. As a result of a current increase exceeding the setpoint current for a preselected time during the driving period, the valve is once again driven in the closing direction.

What is claimed is:

1. A method for driving a solenoid valve, comprising the steps of:

generating a preselected driving signal having at least one changeable quantity for driving the solenoid valve as a function of a pressure to be set, the solenoid valve having stroke ranges in which an unstable equilibrium of forces predominates and having stroke ranges in which a stable equilibrium of forces predominates; and determining the at least one changeable quantity such that a stroke of the solenoid valve essentially remains outside of the stroke ranges having an unstable equilibrium of forces.

2. The method according to claim 1, wherein:
the driving signal is a pulse-width-modulated signal that modulates a current flowing through a valve coil.

3. The method according to claim 2, wherein:
the driving signal is stipulated such that a drop-off phase of the current is provided within which the current falls to a setpoint current for setting a preestablished pressure, and
a flow-through phase is provided in which the solenoid valve is subjected to the setpoint current.

4. The method according to claim 3, wherein:
the driving signal, for a drop-off time and a flow-through time, stipulates the setpoint current for setting the preestablished pressure, and, for a remainder of a driving period, the driving signal stipulates an increased current controlling the solenoid valve in a closing direction.

5. The method according to claim 1, wherein:
a quantity of the driving signal is stipulated such that the solenoid valve, for a flow-through time, opens and then closes once again.

6. The method according to claim 1, further comprising the step of:
forming a control signal quantity only for setting small differential pressures.

7. The method according to claim 1, wherein:
the solenoid valve is a braking system solenoid valve that functions to set a braking pressure in at least one wheel brake.

8. A device for driving a solenoid valve, comprising:
a computing unit containing a program that generates a driving signal for driving the solenoid valve in accordance with a desired pressure, the solenoid valve having stroke ranges of a stable equilibrium of forces and stroke ranges of an unstable equilibrium of forces; and
an arrangement for determining at least one changeable quantity of the driving signal such that one of the conditions occurs:
the stroke ranges of the solenoid valve having the unstable equilibrium of forces are avoided, and
a dwell time of the solenoid valve in the stroke ranges having the unstable equilibrium of forces is reduced.

* * * * *